Aug. 3, 1965  H. B. CUMMINGS  3,198,348
WARE LOADER AND UNLOADER
Filed April 10, 1962  6 Sheets-Sheet 1

Fig. 1

INVENTOR.
HOWARD B. CUMMINGS
BY
*Elg, Learne & Gardon*

ATTORNEYS

Fig. 2

INVENTOR.
HOWARD B. CUMMINGS
ATTORNEYS

Aug. 3, 1965    H. B. CUMMINGS    3,198,348
WARE LOADER AND UNLOADER
Filed April 10, 1962    6 Sheets-Sheet 3

Fig. 3

INVENTOR.
HOWARD B. CUMMINGS
BY
Ely, Pearne & Gordon
ATTORNEYS

Fig. 4

INVENTOR.
HOWARD B. CUMMINGS

Fig. 5

United States Patent Office

3,198,348
Patented Aug. 3, 1965

3,198,348
WARE LOADER AND UNLOADER
Howard B. Cummings, New Castle, Pa., assignor, by mesne assignments, to Shenango Ceramics, Inc., a corporation of Delaware
Filed Apr. 10, 1962, Ser. No. 186,536
2 Claims. (Cl. 214—1)

This invention relates to a machine for loading articles onto or unloading them from a conveyor or turntable, and, more particularly, to a machine for loading unglazed ceramic ware onto a circular glazing machine and removing it from such a machine.

During the manufacture of ceramic ware, unglazed ware (bisque ware or green ware, in the case of so-called semi-vitreous ware) is now usually glazed by spraying a suitable liquid glaze onto the ware while the ware is conveyed through a spray booth. This operation is preferably carried out by means of a large revolving table carrying a plurality of vertical spindles which are rotatably mounted in suitable bearings. Each spindle is provided with a ware holder comprising three wire prongs on which a piece of ware is centered at the loading station. The ware should be centered carefully to prevent it from being tipped or even spun off as the spindles are driven at a fairly high rate of speed in passing by the glaze-spraying guns in the spray booth and, usually, beneath subsequent flames or other drying means before the ware is removed at the unloading station.

In the above-described operation, the ware is usually brought to the loading station as single-high pieces placed on a conveyor or as a bung held at the loading station where successive pieces of ware in the bung are loaded onto the ware-holders. At the unloading station the ware is removed from the holders and either stacked in bungs or placed on a conveyor.

Heretofore, circular glazing machines have required the use of an operator to take pieces of ware, either from a fixed position (in the case of loading from a bung) or from a moving position (in the case of a conveyor), and to center them accurately on the ware holders moving at a constant speed in a circular path. Since the revolving tables are large, they cannot be driven intermittently without creating substantial forces of inertia which are likely to displace ware centered on the holders and overload the driving mechanism for the circular conveyor. Accordingly, substantial dexterity is required by the operator in the tedious and repetitious task of taking the ware from a fixed position or linear path and loading it in an accurately centered position on the ware holders moving in a circular path. In addition to the complicated geometry of movement of the ware during the loading operation, the circular glazing machine should be able to glaze ware of widely varying shapes and diameter, varying for example, from small butter chips to large service plates. To enable a glazing machine to handle such variations in the ware, it is the practice to space the spindles so as to accommodate the most frequent sizes and place the larger sizes of ware on alternate spindles when the diameter of the larger exceeds the spacing between adjacent spindles.

The unloading of a circular glazing machine requires the same type of complicated geometry of movement of the ware as is involved in loading it, through the problem of accurately centering the ware and selecting the proper spindles for ware of varying sizes is not necessarily involved. Even the relatively simple operation of unloading a circular glazing machine has heretofore defied the replacement of an operator with a relatively trouble-free mechanism.

It is the object of this invention to provide a machine which will automatically accomplish both the foregoing operations of loading and unloading ware from the spindles of a rotating glazing machine table. It is an advantage of this invention that such a mechanism is relatively uncomplicated and trouble-free, needing only occasional control and maintenance by personnel requiring no more than the usual degrees of skill required for such work, while dispensing entirely with the need for constant attendance of operators to load and unload such machines.

A further advantages of this invention is that it may be readily adapted to existing glazing machines with minor alterations, and, when so adapted, permits the loading and unloading at greater speeds without interruption for the relief periods required by manual operators, thereby substantially increasing production capacity of the glazing machine.

Other objects and advantages of the invention will appear for the following description of one example of the invention.

Figure 1:
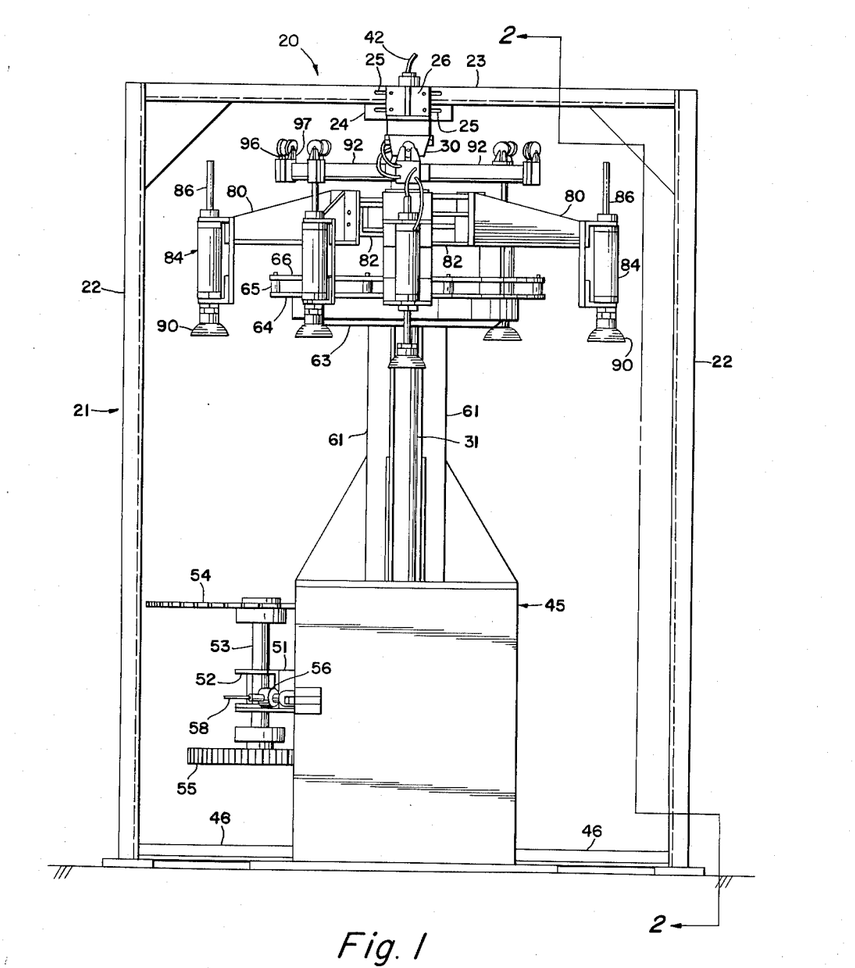
FIGURE 1 is a front elevation of a ware loader and loader embodying the invention.

The complete ware transfer machine 20 is most clearly seen in FIGURE 1. A support bridge 21 consists of a pair of vertical columns 22 and a horizontal beam 23. The horizontal beam 23 includes a pair of vertically depending skirt portions 24 centrally located on either side of the beam 23. The skirt portions 24 each include a pair of horizontally extending slots 25 formed therein. As may be seen in FIGURE 2, a pair of transversely extending cam support arms 26 and 27 are mounted on either skirt portion 24 and are fastened thereto by means of bolts extending through the slots 25. A pair of inner and outer vertically depending cam plates 28 and 29, respectively, are mounted on the outer extremity of the arm 27 and are horizontally and vertically adjustable. A single inner cam plate 30 is mounted on the outer extremity of the arm 26 and is also horizontally and vertically adjustable.

Figure 4:
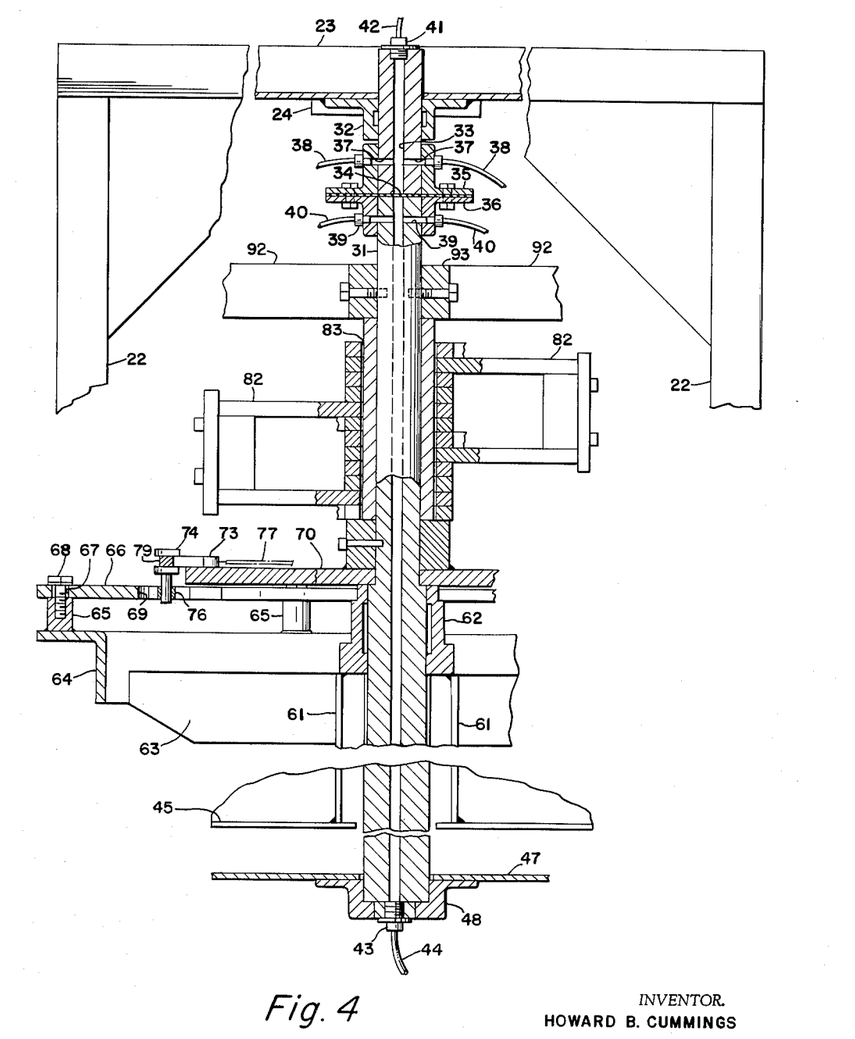
FIGURE 4 is a vertical section of the ware loader and unloader, the plane of the section being indicated by the line 4—4 in FIGURE 3.

As may be seen in FIGURE 4, a vertically extending main drive shaft 31 is journalled for rotation in the mid-portion of the horizontal beam 23 between the arms 26 and 27 in a thrust bearing 32. The drive shaft 31 is provided with an axial bore 33 and is divided near its upper end by a rigid diaphragm 34. The diaphragm 34 extends beyond the periphery of the drive shaft 31 and is sealed thereto by upper and lower sealing flanges 35 and 36, respectively. Six compressed air inlet passageways 37 are drilled through the upper flange 35 and the drive shaft 31 and communicate with the axial bore 33 above the diaphragm 34. Each passageway 37 communicates with a flexible tube 38. Similarly, six vacuum inlet passageways 39 are drilled through the lower flange 36 and the drive shaft 31 and communicate with the axial bore 33 below the diaphragm 34. Each passageway 39 communicates with a flexible tube 40. A rotating joint coupling 41 is provided at the upper end of the drive shaft 31 and provides air-tight communication between the axial bore 33 and a compressed air inlet tube 42. In the same manner, a rotating joint coupling 43 is provided at the lower end of the drive shaft 31 and provides a vacuum seal between the axial bore 33 and a vacuum inlet tube 44. The rotating joint couplings 41 and 43 are commercially available units that effect an air-tight connection while transmitting line pressures from a rotating member to a fixed unit.

Figure 2:
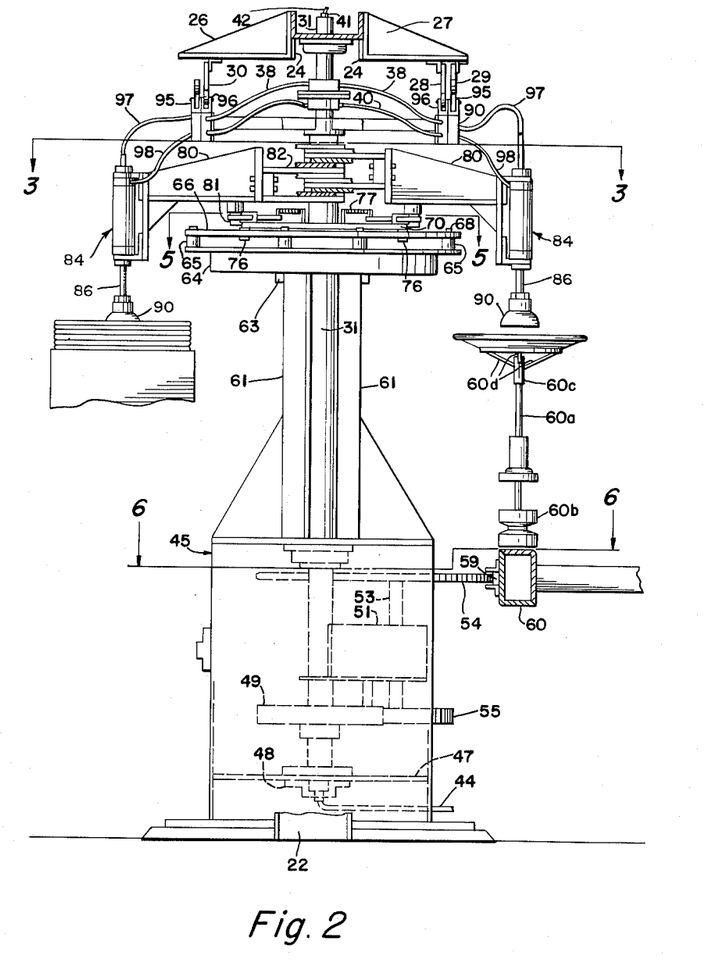
FIGURE 2 is a side elevation of the ware loader and unloader shown in FIGURE 1, taken from the plane of line 2—2 in FIGURE 1, with elements broken away for clarity, and a portion of glazing machine table with which the invention is employed.
Figure 3:
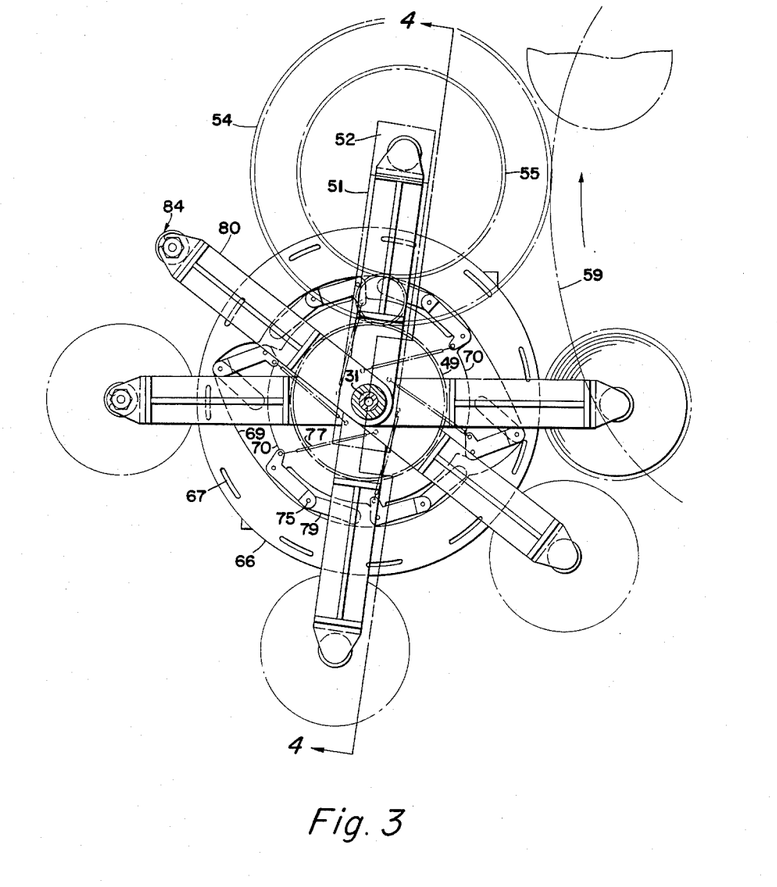
FIGURE 3 is a horizontal sectional view of the ware loader and unloader, the plane of the section being indicated by the line 3—3 in FIGURE 2.
Figure 6:
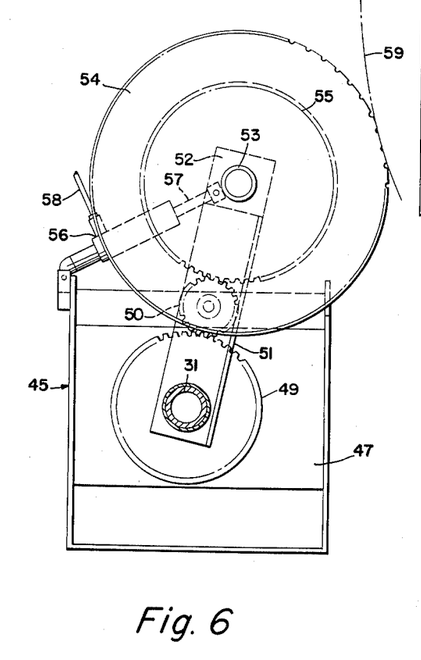
FIGURE 6 is a horizontal sectional view of the ware loader and unloader, the plane of the section being indicated by the line 6—6 in FIGURE 2.

As may be seen in FIGURES 1, 2 and 6, a gear housing and support structure 45 is positioned midway between the vertical columns 22 and is secured thereto by cross-ties 46. A support plate 47 extends between the side walls of the support structure 45. A thrust bearing 48 is mounted on the bottom surface of the support plate 47 and receives the lower end of the main shaft 31 which extends through an aperture in the plate 47.

A spur gear 49 is keyed to the main shaft 31 immediately above the support plate 47 and meshes with an idler gear 50. An L-shaped support beam 51 is pivotally mounted on the drive shaft 31 immediately above the spur gear 49. The idler gear 50 depends from and is journalled for rotation in the horizontal leg portion of the support beam 51. A channel member 52 is mounted on the outer extremity of the support beam 51 and has a vertical bore therethrough which receives a drive axle 53. The drive axle 53 extends through and is journalled for rotation in the horizontally extending leg portions of the channel member 52. A drive sprocket 54 is keyed to the upper end of the drive axle 53 above the upper leg portion of the channel member 52. A spur gear 55 is keyed to the lower end of the drive axle 53 and meshes with the idler gear 50. A single-acting air cylinder 56 having a spring return is hinged to a sidewall of the housing 45 and has a ram 57 that is pivotally connected to the channel member 52.

A flexible tube 58 connects the cylinder 56 to a source of air at a regulated constant pressure (not shown), whereby the sprocket 54 is urged into engagement with the pin-teeth 59 welded or otherwise secured to the vertical edge of the rim of a glazing machine table 60. The pressure in the air tube 58 determines the substantially constant pressure at which the sprocket 54 is held against the rim of the table 60 and is driven by the pin-teeth 59, regardless of the yielding of the gear train which drives the main shaft 31 as its support beam 51 pivots to allow the sprocket 54 to accommodate any eccentricity or out-of-roundness of the rim of the table 60.

The circular glazing machine with which the ware transfer machine is particularly useful forms no part of the present invention and will not be described in detail. Various types and styles of these machines are well known in the ware glazing art. In general, these ware glazing machines comprise a large revolving, horizontal table or wheel 60, adjacent the rim of which is mounted a plurality of equally spaced vertical spindles 60a rotatably mounted in suitable bearings 60b. Each spindle 60a is provided with a ware holder 60c which comprises three radially extending wire prongs 60d. A spray booth (not shown) is conventionally provided adjacent the loading station of the glazing machine at which the ware transfer machine disclosed herein is located. After the ware is conveyed on the spindles through the spray booth, it is then usually conveyed through a flame booth or other drying tunnel (not shown) to dry the glaze on the ware, and thence to an unloading station adjacent the loading station, where another machine, similar to the loading machine disclosed herein, is located and set to unload, rather than load, as will be explained below. For either the loading or unloading operation, any conventional circular glazing machine needs only to be modified to cooperate with the drive transfer machines made according to this invention by providing pin teeth on the rim of the table 60. This is usually done most conveniently by simply welding a standard roller chain to the rim of the table 60. The table 60 itself is driven by whatever drive means (not shown) that would be employed if the glazing machine were to be loaded and unloaded manually.

A multiplicity of support columns 61 extend from the top of the housing 45 and support a flanged bearing 62. The drive shaft 31 extends through and is journalled for rotation in the bearing 62. A pair of transverse supports 63 are each welded to two support columns 61. A fixed ring 64 is welded to the extremities of the transverse supports 63. The ring 64 has a multiplicity of vertical projections 65 welded thereto which support a cam plate 66. The cam plate 66 is provided with a multiplicity of actuate slots 67 and is adjustably secured to the vertical projection 65 by bolts 68 which extend through the slots 67 and into the projections 65. The inner peripheral surface of the cam plate 66 constitutes a cam track 69 which will be more fully set forth below as to function and configuration.

A circular disk 70 is keyed to the drive shaft 31 and lies in a plane spaced slightly above the cam plate 66. The circular disk 70 is provided with six bosses 71 spaced equidistantly around the periphery thereof. Each of the bosses 71 has an axial hole drilled therethrough which receives a pivot pin 72 and a rocker arm 73 which is pivoted about the pin 72. One extremity of the rocker arm 73 has a forked end portion 74 and a pivot pin 75 extending therethrough. The pivot pin 75 extends beyond the bottom of the forked end portion 74 and receives a cylindrical rolling cam follower 76. The cam follower 76 is coplanar with the cam track 69. A spring 77 is connected between the other extremity of each rocker arm 73 and a fixed pin 78 mounted on the disk 70. The spring 77 constantly urges the cam follower 76 against the cam track 69 during the operation of the machine. A driving link 79 is pivoted at one end in each forked end portion 74 of each rocker arm 73 to form a knuckle joint. The other end of each driving link 79 is pivotally connected to a ware transport arm 80 at a pivot point 81. Each ware transport arm 80 lies in the same plane as the others and is pivotally connected to the main drive shaft 31 by a bifurcated bracket 82. The leg portions of the bracket 82 have an axial bore 83 therethrough which receives and forms a running fit with the drive shaft 31, as may be seen in FIGURE 4. Each leg of the bracket 82 overlaps a leg of an adjacent bracket and results in a stepped arrangement of the brackets 82, as is shown particularly in FIGURE 4. This arrangement makes it necessary to bolt the coplanar transport arms 80 to the brackets 82 at different levels, as is shown in FIGURE 2. Each ware transport arm 80 and its associated bracket 82 comprise a cantilever which is supported by the main drive shaft 31 so that little or no vertical force is exerted by an arm 80 on a pivot point 81. The outer end of each arm 80 is provided with a ware pick-up means 84. Because of the running fit between the bracket 82 and the drive shaft 31, each arm is free to pivot about the shaft 31 unaffected by the rotation of the shaft, and, since each arm 80 is pivoted at pivot point 81, the circular movement of each arm is dependent upon the position of its associated pivot point 81 and is unaffected by the position or movement of each other arm and their associated pivot points.

By means of the above cam and linkage arrangement each arm 80 is driven in a circular pattern at a linear velocity and tangential acceleration rate which is determined by the configuration of the cam track 69. As may be seen in FIGURE 5, the major portion of the cam track consists of circular arcs extending from point A to point B and from point D to point E and having a common radius extending from the center of the main shaft 31. Since the disk 70 is driven at a constant angular velocity proportional to the angular velocity of the glazing table, the cam track arcs A–B and D–E will impart a uniform linear velocity to a cam follower 76 traversing these arcs and a resultant uniform linear velocity to the associated pivot point 81. Stated differently, as long as a cam follower is traversing arcs A–B and D–E, an arm 80 linked to that cam will be driven at an angular velocity equal to the angular velocity of the disk 70 and proportional to the angular velocity of the glazing table.

Figure 5:
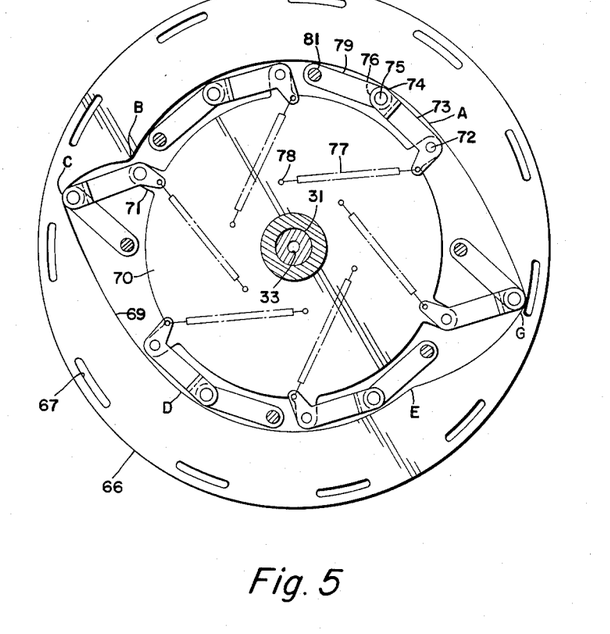
FIGURE 5 is a sectional view showing the indexing linkage of the ware loader and unloader, the plane of the section being indicated by the line 5—5 in FIGURE 2.

A dwell cam surface extending between points B and C is an arc of a circle having a radius equal to the distance between the pivot points 75 and 81 plus the radius of a cam follower 76. The center of arc B–C is located on the circle generated by the pivot points 81 as they rotate around the center of the main shaft 31 and at the point of desired dwell. Thus, as a cam follower 76 traverses the arc B–C, a driving link 79 will merely pivot about a pivot point 81 and will not impart force to the point 81. While a cam follower traverses the arc B–C, therefore, an associated ware transport arm 80 will dwell for a period of time dependent upon the length of the arc B–C and upon the angular velocity imparted to a driving link 79 by the disk 70 and an associated rocker arm 73.

A deceleration cam surface extending between the points E and G is outwardly sloped to impart a uniformly decreasing tangential acceleration to a pivot point 81 and its associated ware transport arm 80. The slope of the curve E–G is such that when a cam follower 76 is at point E an associated ware pick-up means 84 is being driven at a linear velocity greater than that of the spindles of the glaze table. At point E, of course, the angular velocity of a cam follower 76 is equal to that of the disk 70 and this angular velocity is greater than that of the glazing table because of the relatively high gear ratio between the pin teeth 59 and the sprocket 54. When a cam follower 76 reaches point G, however, the slope of the curve E–G is such that an associated ware pick-up means 84 is being driven at linear velocity that is precisely the same as the linear velocity of the spindles of the glaze table.

A pair of inwardly sloped accelerating cam surfaces defined by the points C and D and points G and A serve to return the transport arms 80 to their normal condition of being driven at a uniform angular velocity. The particular slope of curves C–D and G–A is not important provided that it is not too drastic.

Figure 7:
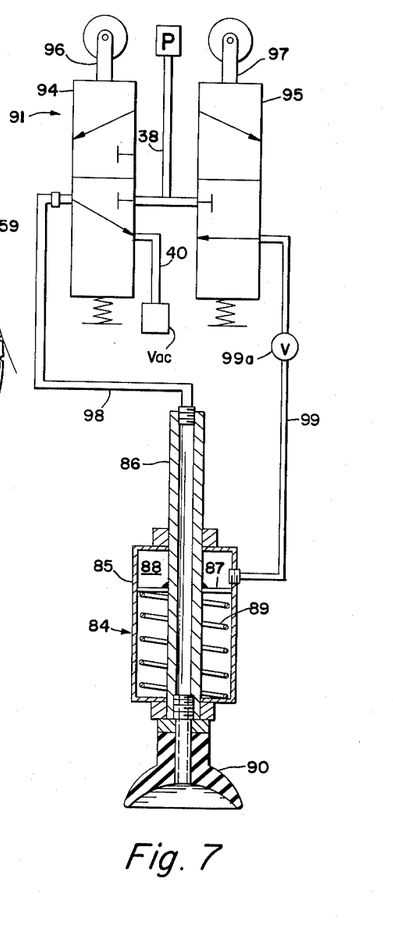
FIGURE 7 is an enlarged sectional, partly schematic, view of a ware holder with an associated valve control mechanism.

As was previously explained, each ware transport arm 80 is provided with a ware pick-up means 84 at its outer extremity. As is shown most comprehensively in FIGURE 7, the ware pick-up means 84 comprises a cylinder 85 having a hollow ram 86 axially slidable therein. A piston 87 is affixed to the ram 86 and defines a pressure chamber 88 in the cylinder 85. A spring 89 urges the piston 87 and the ram 86 to a normally retracted position, as is shown in FIGURE 7. The lower end of the hollow ram is provided with a flexible suction cup 90.

Each ware pick-up means 84 is provided with a control valve unit 91. The control valve units are each mounted on a radially extending arm 92 and each arm 92 is fixed to a collar 93 which, in turn, is keyed to the drive shaft 31. The arms 92 are spaced equidistantly from one another and above a ware transport arm 80 so that they are in vertical alignment with a ware transport arm 80 when a uniform velocity is imparted to a transport arm.

The valve control unit 91 comprises a vacuum control portion 94 and a ram control portion 95 which are independently and mechanically operated by push rods 96 and 97, respectively. The previously described flexible tubes 38 leading from the compressed air inlet passageways 37 communicate with both the vacuum control portion 94 and the ram control portion 95 of a control valve unit 91. Each of the flexible tubes 40 leading from the vacuum inlet passageways 39 communicates with the vacuum control portion 94 of a control valve unit 91. The vacuum control portion 94 of a unit 91 communicates with the top of the hollow ram 86 through a flexible tube 98 and the ram control portion 95 of a unit 91 communicates with the pressure chamber 88 through a flexible tube 99. An optional shut-off valve 99a, not shown except diagrammatically in FIGURE 7, may be provided in tube 99 if it is desired to render a particular ware pick-up means 84 inoperative.

As is shown in FIGURE 7, the push rods 96 and 97 are spring biased in a normally upwardly extending position. In this position the flexible tube 98 leading to the vacuum control portion 94 is in communication with the vacuum source (Vac.) through the tube 40, a passageway 39, the bore 33, and the tube 44 and air is drawn upwardly through the hollow ram 86. The flexible tube 99 is ported to the atmosphere through the ram control portion 95 of the unit 91; and the flexible tube 38, which is in communication with the air pressure supply means P through a passageway 37, the bore 33, and the tube 42, is blocked in both portions of a unit 91 as is shown in FIGURE 7. When the push rod 96 is depressed, the tube 38 will be in communication with the tube 98 and compressed air will be blown through the hollow ram 86. With the push rod 96 in this depressed condition the tube 40 will be blocked in the portion 94. When the push rod 97 is depressed, the tube 99 will be in communication with the tube 38 and compressed air will be admittted to the chamber 88 under a sufficient pressure to overcome the bias of the spring 89 and extend the ram 86.

The inner vertically depending cam plate 28, which is mounted on the outer extremity of the arm 27, is positioned so that the push rod 97 of a unit 91 will strike the inner cam plate 28 when a ware pick-up means 84 and its associated ware transport arm 80, which are located below and in pneumatic communication with that unit 91, begin to decelerate. The outer cam plate 29, which is also mounted on the outer extremity of the arm 27, is positioned so that the push rod 96 of a unit 91 will strike the outer cam plate 29 when a ware pick-up means 84 and its associated ware transport arm 80 decelerate and attain the same linear velocity as the spindles of the glazing table.

The single inner cam plate 30 mounted on the outer extremity of the arm 26 is positioned so that the push rod 97 of a unit 91 will strike the inner cam plate 30 when a ware pick-up means 84 and its associated ware transport arm 80 begin their dwell period as was previously described. The length of the cam plate 30 is selected so that a push rod 97 will be released prior to the end of the dwell period.

Set-up and operation

The ware transfer machine 20 is set up by a placing it at the loading station of a glazing table with the arm 27 of the transfer machine frame pointing toward the center of the glazing machine table. The cam plates 28 and 29 operating the ware pick-up means 84 are adjusted so that, when a pick-up means 84 is aligned with the line between the center of the glazing machine table and the axis of the main shaft 31, the vacuum control portion 94 is operated to break the vacuum and admit air to the tube 98 and the ram control portion 95 is operated to force the hollow ram 86 downwardly. In operation, this downward movement of the ram gently places ware carried by the pick-up means 84 on the prongs 60d of the ware holders 60c and the operation of the vacuum control portion 94 quickly releases ware from the suction cup 90.

The cam plate 66 is then adjusted so that the cam follower 76, associated with the arm 80 carrying the aligned pick-up means 84, is precisely at the point G on the cam plate. The cam plate 66 is then locked in this position by means of the bolts 68. In operation this insures that, due to the curvature of the cam track from point E to G, the arm 80, pick-up means 84, and ware carried thereby will have decelerated until, at the moment of release, their linear velocity will be precisely equal to the linear velocity of the centers of the spindles on the glazing machine and there will be no change in the momentum of the ware at the instant of release and placement on the ware spindles.

With the sprocket 54 pulled out of engagement with the pin teeth 59 on the rim of the glazing machine table, the table is rotated until a spindle is precisely centered under a ware pick-up means 84. The sprocket 54, still free to turn on the axle 53, is then allowed to swing into engagement with the pin-teeth 59 and the hub of the sprocket is then drilled and pinned or otherwise fixed to the axle 53 in this indexed position. The ratio of the gearing from the sprocket 54 to the main shaft 31 is such that as each successive spindle on the glazing machine table reaches the line between the center of the main shaft 31 and the table, each successive arm 80 will likewise be aligned, the cam plate 28 and 29 for each arm being adjusted to effect release of the ware at this instant.

Opposite the ware release point is a ware pick-up station at which a pick-up means 84 dwells without angular movement due to the curvature of the cam track 69 between points B and C. The cam plate 30 is then adjusted so that during the period its associated pick-up means 84 dwells at the pick-up station, the ram control portion 95 is opened and closed to drive the ram 86 downwards and to lift the ram up to its normal retracted position.

Thus, in operation, ware is brought to the pick-up station, centered beneath dwelling pick-up means and held at an elevation where the cup 90 contacts the center of the ware at the downwardmost position of the cup, which, due to the constantly operating vacuum in the line 97, picks up the ware to clear other ware (if it is brought to the pick-up station in a bung, as shown in FIGURE 2) or centering guides or the like (if the ware is brought to the pick-up station on a belt conveyor). When ware is stacked in a bung at the pick-up station, a suitable elevating means (not shown in detail) is employed to raise the bung after each pick-up so that the succeeding top piece of ware in the bung will be at the proper elevation for the succeeding pick-up.

With the ware picked up at the pick-up station, it is then carried by the arm 80 through 180° and released in a centered position on a ware spindle, as described above.

If the size of the ware is such that there would be interference between pieces of ware placed on each succeeding spindle on the glazing machine table, the valve 99a in the line 99 is simply closed on alternate arms 80 so that only alternate arms pick up ware at the pick-up station and place the ware, accordingly, on alternate spindles on the glazing machine table.

It is also to be understood that either as a ware loader or unloader its cam plate 66 may be provided with more than two recesses to provide decelerations or dwells in the travel of the arm 80 to hold the ware for other operations intermediate the pick-up and release of ware by the machine.

To set up and operate the machine 20 as a ware unloader, the machine is installed at the unloading station of the glazing machine with the arm 26 pointing toward the center of the glazing machine. The cam plate 30 is then adjusted so that, during the dwell of an arm 80 as its associated cam follower follows the cam track between the points B and C, the ram 86 of a pick-up means 84 will be driven to its lowest point as dried glazed ware on a spindle passes beneath it. The ware is then carried to a conveyor belt, moving at approximately the linear velocity of the arm at the moment of release. If the unloaded ware is to be stacked in a bung, a substitute cam track, having oppositely disposed curvature similar to the curvature between points B and C is provided so that the arm 880 will remain stationary as its associated ram 86 descends, releases the ware on the top of a bung, and raises to clear the ware during the dwell period. In such cases, the bung is supported on a support which intermittently lowers the bung as successive pieces of ware are stacked.

The scope of the invention is not limited to the practice of all the structural and operative details mentioned above. These have been given merely by way of an example of a presently preferred embodiment of the invention.

What is claimed is:

1. Ware transport apparatus for conveying unglazed ceramic ware to the spindles of a glazing table, rotating at a constant angular velocity, from a stationary loading station comprising a stationary support bridge, a vertically depending shaft journalled for rotation in said support bridge, drive means for driving said shaft at a constant angular velocity, a plurality of radially extending arms supported by and freely rotatable about said shaft, a ware pick-up means affixed to the end of each of said arms, a circular disk fixedly secured to said main shaft, a cam plate fixedly secured to said support bridge below said circular disk, means defining a cam track on said cam plate, cam linkage means for each of said arms pivotally connected to said disk and to said arms and having a cam follower engaging said cam track to cause said ware pick-up means to dwell at a ware pick-up station and to decelerate from an angular velocity equal to that of the main shaft to a linear velocity equal to that of a spindle on said glazing table, means activating said ware pick-up means at said ware pick-up station to cause said ware pick-up means to firmly engage ware at said pick-up station, and means deactivating said ware pick-up means when said ware pick-up means is decelerated to a linear speed equal to that of a spindle on said glazing table, whereby the ware will be disengaged from said ware pick-up means and will drop to and be received by said spindle.

2. Ware transport apparatus for conveying unglazed ceramic ware to the spindles of a glazing table, rotating at a constant angular velocity, from a stationary loading station comprising a stationary support bridge, a vertically depending shaft journalled for rotation in said support bridge, drive means for driving said shaft at a constant angular velocity, a plurality of radially extending arms supported by and freely rotatable about said shaft, a ware pick-up means affixed to the end of each of said arms, said ware pick-up means comprising a cylinder and an extensible pneumatically actuated hollow ram axially slidable in said cylinder and having a suction cup at its lower end, a circular disk fixedly secured to said main shaft, a cam plate fixedly secured to said support bridge below said circular disk, means defining a cam track on said cam place, cam linkage means for each of said arms pivotally connected to said disk and to said arms and having a cam follower engaging said cam track to cause said ware pick-up means to dwell at a ware pick-up station and to decelerate from an angular velocity equal to that of the main shaft to a linear velocity equal to that of a spindle on said glazing table, a compressed air source, a vacuum source, tube means pneumatically connecting each cylinder with said compressed air source to extend said ram, tube means pneumatically connecting each hollow ram with said vacuum source to create a vacuum in said hollow ram and thereby hold said ware against said suction cup, a cam actuated control valve unit for each of said ware pick-up means affixed to said main shaft pneumatically connected to each of said tube means, said control valve unit having a cam actuated vacuum control portion for controlling the vacuum in said hollow ram and for admitting compressed air to said hollow ram and having a cam actuated ram control portion for admitting compressed air to said cylinder, a cam plate fixedly secured to said support bridge above said ware pick-up station to actuate said ram control portion of said control valve unit, and a pair of cam plates fixedly secured to said support bridge above said spindles to actuate said ram control portion and said vacuum control portion of said control valve unit.

References Cited by the Examiner
UNITED STATES PATENTS

| | | |
|---|---|---|
| 1,654,091 | 12/02 | Peiler. |
| 2,247,787 | 7/41 | Schmidt. |
| 2,359,432 | 10/44 | McNamara. |
| 2,359,433 | 10/44 | McNamara. |

HUGO O. SCHULZ, *Primary Examiner.*